US 6,783,619 B2

(12) United States Patent
Caretta

(10) Patent No.: US 6,783,619 B2
(45) Date of Patent: Aug. 31, 2004

(54) METHOD FOR MANUFACTURING A TYRE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 184 days.

(21) Appl. No.: 10/223,353

(22) Filed: Aug. 20, 2002

(65) Prior Publication Data

US 2002/0189737 A1 Dec. 19, 2002

Related U.S. Application Data

(62) Division of application No. 09/362,998, filed on Jul. 30, 1999, now Pat. No. 6,457,504.
(60) Provisional application No. 60/106,104, filed on Oct. 29, 1998.

(30) Foreign Application Priority Data

Jul. 31, 1998 (EP) .............................. 98830472

(51) Int. Cl.⁷ .......................... B29D 30/16; B29D 30/18
(52) U.S. Cl. ...................... 156/117; 156/131; 156/133; 156/135
(58) Field of Search ................................ 156/117, 123, 156/130.7, 131, 132, 133, 135, 397, 136, 540, 550

(56) References Cited

U.S. PATENT DOCUMENTS

| | | | |
|---|---|---|---|
| 1,453,865 A | * | 5/1923 | Dickinson et al. .......... 156/117 |
| 1,728,957 A | | 9/1929 | Dickinson |
| 3,072,171 A | | 1/1963 | Drakeford et al. |
| 3,240,250 A | | 3/1966 | Frazier |
| 3,826,297 A | | 7/1974 | Alderfer |
| 4,248,287 A | | 2/1981 | Christman |
| 5,362,343 A | | 11/1994 | Debroche |
| 5,453,140 A | | 9/1995 | Laurent et al. |
| 5,660,656 A | | 8/1997 | Herbelleauu et al. |
| 5,702,548 A | | 12/1997 | Arnaud et al. |
| 5,705,007 A | | 1/1998 | Bohm et al. |
| 6,318,432 B1 | | 11/2001 | Caretta et al. |
| 6,328,084 B1 | | 12/2001 | Caretta et al. |
| 6,623,584 B2 | * | 9/2003 | Caretta ....................... 156/133 |

FOREIGN PATENT DOCUMENTS

| | | |
|---|---|---|
| EP | 0 664 231 A1 | 7/1995 |
| EP | 0 928 702 A1 | 7/1999 |
| FR | 384 231 | 4/1908 |

OTHER PUBLICATIONS

English Language Derwent Abstract of EP 0 664 231.
English Language Abstract of EP 0 664 231.
European Search Report for EP 98 83 0472, dated May 26, 1999.

* cited by examiner

Primary Examiner—Geoffrey L. Knable
(74) Attorney, Agent, or Firm—Finnegan, Henderson, Farabow, Garrett & Dunner, L.L.P.

(57) ABSTRACT

A method for manufacturing a tire includes the steps of preparing strip sections, laying down a first series of the strip sections on a toroidal support, applying at least primary portions of annular reinforcing structures against end flaps of the strip sections of the first series at axially-opposite positions relative to an equatorial plane of the toroidal support, and laying down on the toroidal support at least one second series of the strip sections. Each strip section extends in a substantially U-shaped configuration around a cross-sectional outline of the toroidal support. First series strip sections are circumferentially distributed according to a pitch corresponding to a multiple of their width. Second series strip sections extend between consecutive first series strip sections and include end flaps overlapping respective primary portions of the annular reinforcing structures at an axially-opposite position relative to end flaps of the first series strip sections.

16 Claims, 5 Drawing Sheets

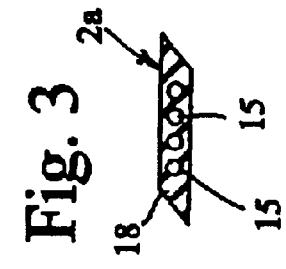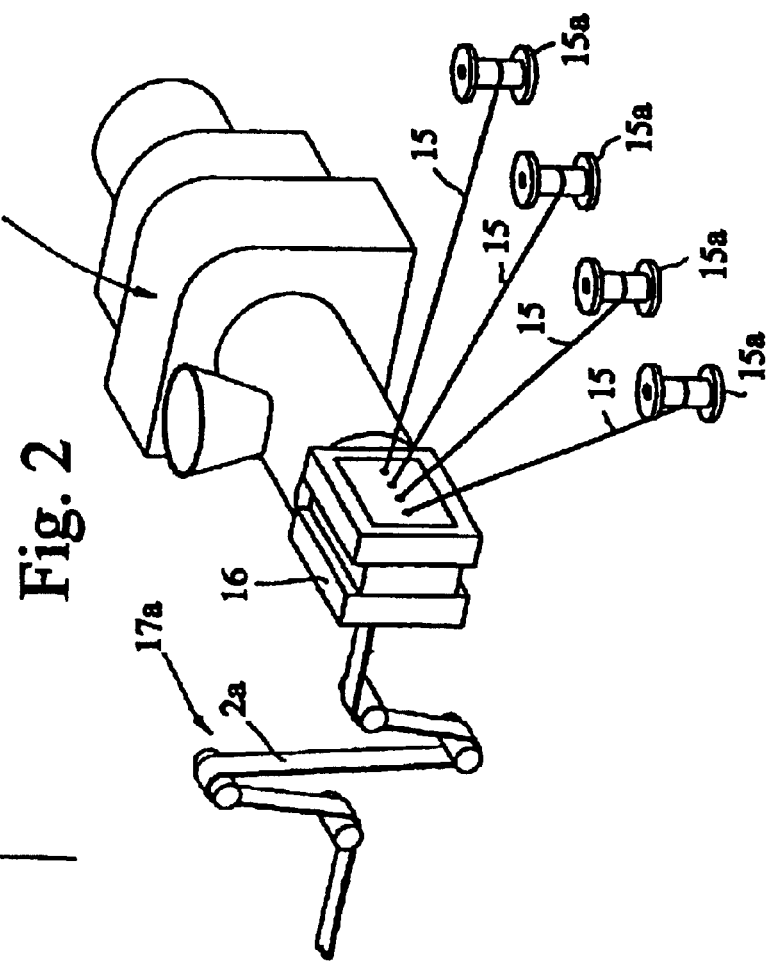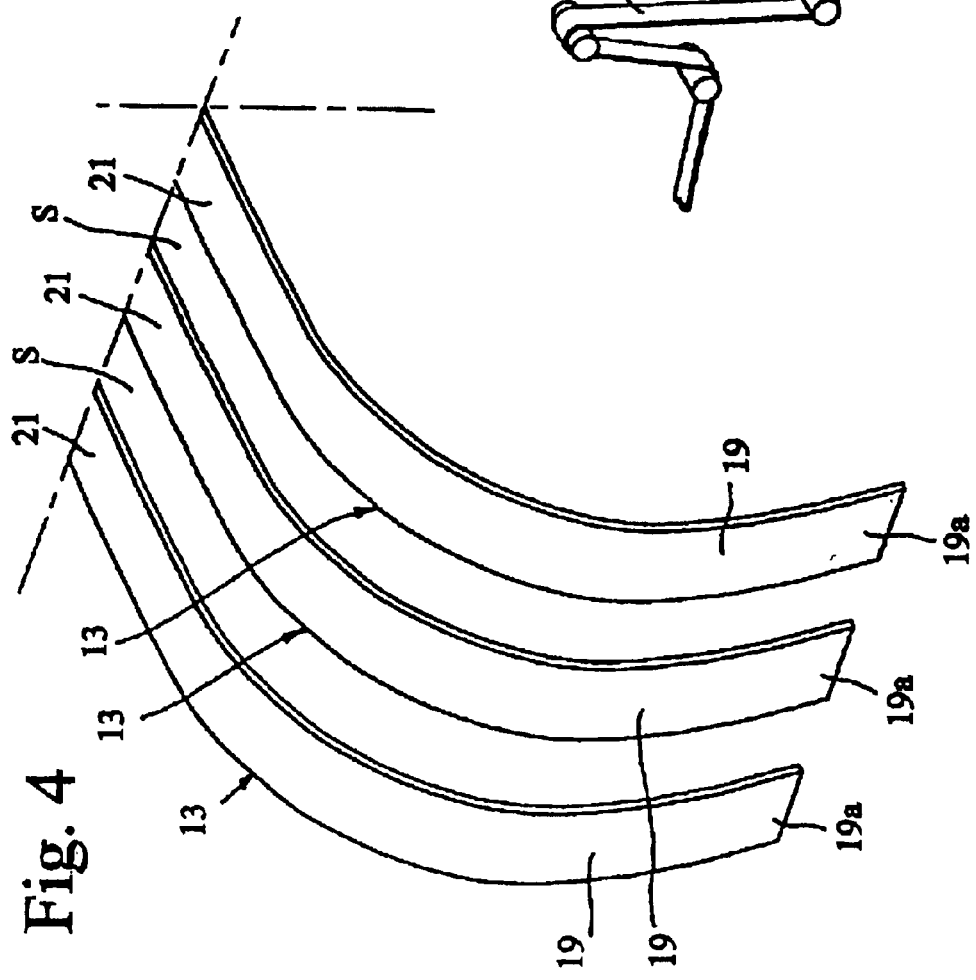

METHOD FOR MANUFACTURING A TYRE

CROSS-REFERENCE TO RELATED APPLICATIONS

This application is a divisional of U.S. patent application Ser. No. 09/362,998, filed Jul. 30, 1999, in the U.S. Patent and Trademark Office now U.S. Pat. No. 6,457,504 the contents of which are relied upon and incorporated herein by reference; additionally, Applicant claims the right of priority under 35 U.S.C. § 119(a)–(d) based on patent application No. 98830472.1, filed Jul. 31, 1998, in the European Patent Office; further, Applicant claims the benefit under 35 U.S.C. § 119(e) based on prior-filed, copending provisional application No. 60/106,104, filed Oct. 29, 1998, in the U.S. Patent and Trademark Office.

BACKGROUND OF THE NVENTION

1. Field of the Invention

The present invention relates to a method of manufacturing a carcass structure for tires for vehicle wheels.

The invention also relates to a carcass structure for tires for vehicle wheels obtainable by the above method, said carcass structure comprising: at least one carcass ply formed of strip-like sections each of which extends in a substantially U-shaped conformation following the cross-section outline of the tire and comprises one or more thread-like elements longitudinally arranged parallelly of each other and preferably at least partly coated with a layer of raw elastomer material; and a pair of annular reinforcing structures each engaged close to a respective inner circumferential edge of the carcass ply.

2. Description of the Related Art

Manufacture of tires for vehicle wheels involves formation of a carcass structure essentially made up of one or more carcass plies substantially having a toroidal conformation and presenting their axially opposite side edges engaged to respective annular, circumferentially inextensible, reinforcing elements usually referred as "bead cores".

Applied to the carcass structure, at a circumferentially outer position, is a belt structure comprising one or more belt strips having the shape of a closed ring, which are essentially made up of textile or metal cords suitably oriented relative to each other and to the cords belonging to the adjacent carcass plies.

Then, at a circumferentially outer position of the belt structure a tread band is applied which usually consists of a strip of elastomer material of suitable thickness.

It is to point out that, to the aims of the present description, by the term "elastomer material" it is intended a rubber blend in its entirety, i.e. the assembly formed of a base polymer suitably amalgamated with mineral fillers and/or additives of other type.

Ultimately, a pair of sidewalls is applied to the opposite sides of a tire being manufactured, each of said sidewalls covering a side portion of the tire included between a so-called shoulder region, arranged close to the corresponding side edge of the tread band, and a so-called bead arranged at the corresponding bead core.

The traditional production methods essentially provide that the above listed tire components should be first made separately of each other, to be then assembled during a step of the tire manufacturing.

For example, for making the carcass ply or plies to be associated with the bead cores in order to form the carcass structure, it is first required that, by an extrusion and/or calendering process, a rubberized fabric comprising longitudinally-disposed continuous textile or metal cords should be produced. This rubberized fabric is submitted to a transverse cutting operation to produce sections of predetermined lengths that are subsequently joined together so as to give origin to a continuous ribbon-like semifinished product, having transversely-arranged parallel cords.

This manufactured article must then be cut into sections the length of which is to be correlated with the circumferential extension of the carcass to be produced.

Also proposed have been manufacturing methods that, instead of resorting to production of semifinished articles, make the carcass structure directly during the tire manufacturing steps.

For example, U.S. Pat. No. 5,453,140 herein referred to as an example of the most pertinent state of the art, discloses a method and an apparatus forming the carcass ply starting from a single cord that has been previously wound up on a reel.

In accordance with the method and apparatus described in the above patent, at each working cycle of the apparatus the cord taken up from the reel by power-driven pulling rollers and maintained taut by a pneumatic tensioning system is cut to size so as to obtain a section of a predetermined length.

The cord section is taken up by a grip element mounted on a belt looped around power-driven pulleys to be transversely laid down on the outer surface of a toroidal support.

The section ends are then engaged by folding members of the belt type operating on opposite sides of the toroidal support to radially apply the cord section to the toroidal support itself by slider elements acting like fingers along the section side portions.

Repetition of the above described working cycle leads to deposition of these cord sections in a circumferential side-by-side relationship until the whole circumferential extension of the toroidal support is covered.

Necessarily, the toroidal support is previously coated with one or more raw rubber layers having a dual function, that of adhering to the cords laid down thereon so as to conveniently hold them in a fixed positioning, and that of forming an inner air-proof layer in the finished tire.

Tires obtained by this manufacturing method have a carcass structure in which the carcass ply or plies are formed of individual cords each having two side portions axially spaced apart from each other and radially oriented relative to the rotation axis of the tire, and a crown portion extending at a radially outer position between the side portions.

Within the scope of the carcass structure manufacture, it is also known that close to each of the tire beads, the opposite ends of the individual cords forming a carcass ply are arranged in an alternating sequence, at axially opposite positions relative to an annular anchoring element forming said bead core, having the shape of a crown made up of radially-overlapping wire coils, as can be viewed from Patent EP 0 664 231 and U.S. Pat. No. 5,702,548.

However, the cords forming the carcass ply or plies are substantially arranged in the neutral axis of resistance to bending of the respective bead. Under this circumstance, the structural resistance of the beads must necessarily rely on the stiffness of the filling inserts of very hard elastomer material incorporated into the bead structure, the behaviour of which feels the effects of temperature changes due both to environmental factors and to stresses produced during normal operation.

In Patent FR 384 231 it is proposed to make a carcass structure by deposition on a toroidal support, of a series of rectangular small bands of rubberized fabric disposed in side-by-side relationship and arranged in radial planes relative to the geometric axis of the support drum itself. Deposition of the small bands is carried out in such a manner that the end flaps of two non-consecutive small bands are partly covered by the end flaps of the small band interposed therebetween. Spaces existing between the end flaps of the covered small bands are filled with trapezoidal inserts applied to the end flaps of the small band placed in overlapping relationship thereon. Deposition of the small bands is executed in different overlapped layers, the number of which is correlated with the thickness to be given to the carcass structure. The presence of said trapezoidal inserts gives rise to thickening of the carcass structure at the bead regions, where it has a thickness which is twice that found at the crown.

In U.S. Pat. No. 4,248,287 it is disclosed a method according to which formation of the carcass structure involves that a plurality of layers each formed of radial strips consisting of rubberized threads and circumferentially disposed in side by side relationship should be laid down on a toroidal drum. When deposition has been completed, at the bead region two bead cores are applied and the end flaps of the carcass layers formed by the radial strips are then turned back around them.

SUMMARY OF THE INVENTION

In accordance with the present invention, it has been found that within the tire-manufacturing scope surprising advantages can be achieved if the carcass ply or plies are made by laying down at least two distinct series of strip-like sections in an alternating sequence, and arranging the bead-reinforcing annular structures, or at least part of them, at an axially interposed position between the end flaps belonging to the sections of one series and those of the other series, respectively.

In more detail, the invention relates to a method of manufacturing a carcass structure for motor-vehicle tires, characterized in that it comprises the steps of: preparing strip-like sections each comprising one or more longitudinal and parallel thread-like elements preferably coated at least partly with at least one layer of raw elastomer material; laying down a first series of said strip-like sections onto a toroidal support, each of them extending in a substantially U-shaped configuration around the cross-section outline of the toroidal support itself and circumferentially distributed according to a circumferential pitch corresponding to a multiple of the strip-like section width, applying at least primary portions of annular reinforcing structures against end flaps of said strip-like sections belonging to the first series, at axially opposite positions relative to an equatorial plane of the support drum; laying down on the toroidal support at least one second series of said strip-like sections each extending according to a U-shaped conformation around the cross-section outline of the toroidal support, between two consecutive sections of the first series, each of the sections of the second series having end flaps overlapping the respective primary portions of the annular reinforcing structures at an axially opposite position relative to the end flaps of the sections of the first series.

Preferably, also carried out is the step of applying additional portions of the annular reinforcing structures against the end flaps of the strip-like sections belonging to the second series, so that each of said end flaps is enclosed between the primary portion and the additional portion of the respective annular reinforcing structure.

It is also preferably provided that each of the strip-like sections of the first and second series should be laid down so as to form two side portions substantially extending in the direction of the geometric rotation axis of the toroidal support at mutually spaced apart positions in an axial direction, and a crown portion extending at a radially outer position between the side portions, the crown portions of each strip-like section being disposed consecutively in side by side relationship along the circumferential extension of the toroidal support.

It can be also provided that the side portions of each strip-like section belonging to the first series should be each partly covered with a side portion of at least one circumferentially consecutive section belonging to the second series, at a stretch included between a radially outer edge of the primary portion of the annular reinforcing structure and a transition region between said side portions and said crown portions.

In more detail, covering of the side portions of each strip-like section belonging to the first series progressively decreases starting from a maximum value close to the outer circumferential edge of the primary portion of each annular reinforcing structure until a null value at the transition regions between said side portions and crown portions.

Preferably, the side portions of said strip-like sections are made radially converge towards the geometric rotation axis of the toroidal support.

Also provided may be at least one operating step aiming at defining regions of greater width close to the inner circumferential edges of the carcass structure.

If, as provided in a preferential embodiment, preparing of said strip-like sections takes place by cutting actions sequentially carried out on at least one continuous strip-like element incorporating said thread-like elements in said layer of raw elastomer material, the step of defining regions of greater width can be advantageously carried out on the continuous strip-like element before performing the cutting action.

In accordance with a further aspect of the invention, to be also adopted independently of that which has been previously said, accomplishment of said at least one primary portion of each annular reinforcing structure comprises the steps of: laying down at least one first elongated element in concentric coils to form a first circumferentially inextensible annular insert substantially in the form of a crown; forming at least one filling body of raw elastomer material; joining the filling body to the first circumferentially inextensible annular insert.

In more detail, the first elongated element is preferably deposited directly against the end flaps of the strip-like sections belonging to the first series, to form the first annular insert directly in contact with the strip-like sections themselves.

The filling body can be in turn formed by depositing a continuous strip of elastomer material directly against the first annular insert previously applied to the end flaps of the strip-like sections belonging to the first series.

In accordance with a further embodiment, the first elongated element is laid down in a forming seat defined in a moulding cavity in which the filling body is subsequently formed, so that joining of said filling body to the first annular insert is carried out concurrently with formation of the filling body itself.

Alternatively, the joining step can be carried out by applying the filling body against the first annular insert previously applied to the end flaps of the sections belonging to the first series.

It can be also provided that formation of said primary portion of the annular reinforcing structure should comprise the further steps of: depositing at least one second elongated element in concentric coils to form a second circumferentially inextensible annular insert substantially in the form of a crown; and joining said second annular insert to the filling body, on the opposite side relative to the first annular insert.

Preferably, formation of said additional portion of each annular reinforcing structure comprises the step of depositing at least one second elongated element in concentric coils to form a second circumferentially inextensible annular insert substantially in the form of a crown.

Said second elongated element is preferentially laid down directly against the carcass structure during a formation step on the toroidal support.

It is a further object of the invention to provide a carcass structure for vehicle wheel tires, characterized in that said carcass ply comprises: a first and a second series of strip-like sections arranged in a mutually alternating sequence along the circumferential extension of the carcass structure, each of said annular reinforcing structures comprising at least one primary portion having an axially inner side turned towards the end flaps of the sections belonging to the first series and an axially outer side turned towards the end flaps of the sections belonging to the second series.

It is preferably provided that each of said annular reinforcing structures further comprises at least one additional portion disposed against the end flaps of the strip-like sections belonging to the second series, on the opposite side relative to the primary portion of the annular structure itself.

Preferably, each of said strip-like sections has two side portions substantially extending in the direction of the geometric rotation axis of the carcass structure at mutually spaced apart positions in an axial direction, and a crown portion extending at a radially outer position between the side portions, the crown portions belonging to the sections of the first and second series respectively being arranged in side by side relationship along the circumferential extension of the carcass structure.

It can be also provided that the side portions of each strip-like section belonging to the first series should be each partly covered with a side portion of at least one adjacent strip-like section belonging to the second series, at a stretch included between a radially outer edge of the primary portion of the annular reinforcing structure and a transition region between said side portions and crown portions.

In more detail, covering of the side portions of each strip-like section belonging to the first series progressively decreases starting from a maximum value close to the outer circumferential edge of the primary portion of each annular reinforcing structure until a null value at the transition regions between said side portions and crown portions.

Advantageously, the side portions of said strip-like sections radially converge towards the geometric rotation axis of the carcass structure.

The individual strip-like sections belonging to one of said first and second series respectively are advantageously disposed according to a circumferential distribution pitch corresponding to a multiple of the width of the strip-like sections themselves.

It can be also provided that each strip-like section should have regions of greater width close to the inner circumferential edges of the carcass structure.

In this case, the thread-like elements included in each strip-like element are mutually spaced apart at said regions of greater width.

Preferably, each of said strip-like sections has a width included between 3 and 15 mm, and comprises three to eight thread-like elements.

In particular, said thread-like elements are disposed in the respective strip-like sections according to a mutual distance between centres not lower than 1.5 times the diameter of the thread-like elements themselves.

In accordance with a further independent aspect of the invention, the primary portion of each of said inextensible annular structures comprises: a first circumferentially inextensible annular insert substantially in the form of a crown disposed coaxially with the carcass structure and close to an inner circumferential edge of the first carcass ply, said first annular insert being made up of at least one elongated element extending in concentric coils; and a filling body of elastomer material having a side joined to the first annular insert.

It can be also provided that each of said annular reinforcing structures should further comprise at least one second circumferentially inextensible annular insert substantially in the form of a crown, made up of at least one elongated element extending in concentric coils and disposed coaxially with the carcass structure at a position axially in side by side relationship with the filling body and laterally opposite to the first annular insert.

Preferably, said second annular insert is part of an additional portion of said reinforcing structure disposed against the end flaps of the strip-like sections belonging to the second series, on the opposite side relative to the primary portion of the annular structure itself.

Conveniently the second circumferentially inextensible annular insert has a radial extension greater than the radial extension of the first circumferentially inextensible annular insert, and said filling body of elastomer material has a hardness included between 48° and 55° Shore D at 23° C.

BRIEF DESCRIPTION OF THE DRAWINGS

Further features and advantages will become more apparent from the detailed description of a preferred, non-exclusive embodiment of a method of manufacturing a carcass structure for tires for vehicle wheels, and a carcass structure obtainable by said method, in accordance with the present invention. This description will be taken hereinafter with reference to the accompanying drawings, given by way of non-limiting example, in which:

FIG. 2 is a diagram showing accomplishment of a continuous strip-like element intended for formation of the carcass ply or plies;

FIG. 3 is a cross-section of an embodiment of said strip-like element;

FIG. 4 is a fragmentary perspective view diagrammatically showing the deposition sequence of a first series of strip-like sections for formation of a tire carcass ply in accordance with the invention;

DETAILED DESCRIPTION OF THE PREFERRED EMBODIMENTS

Figure 1:
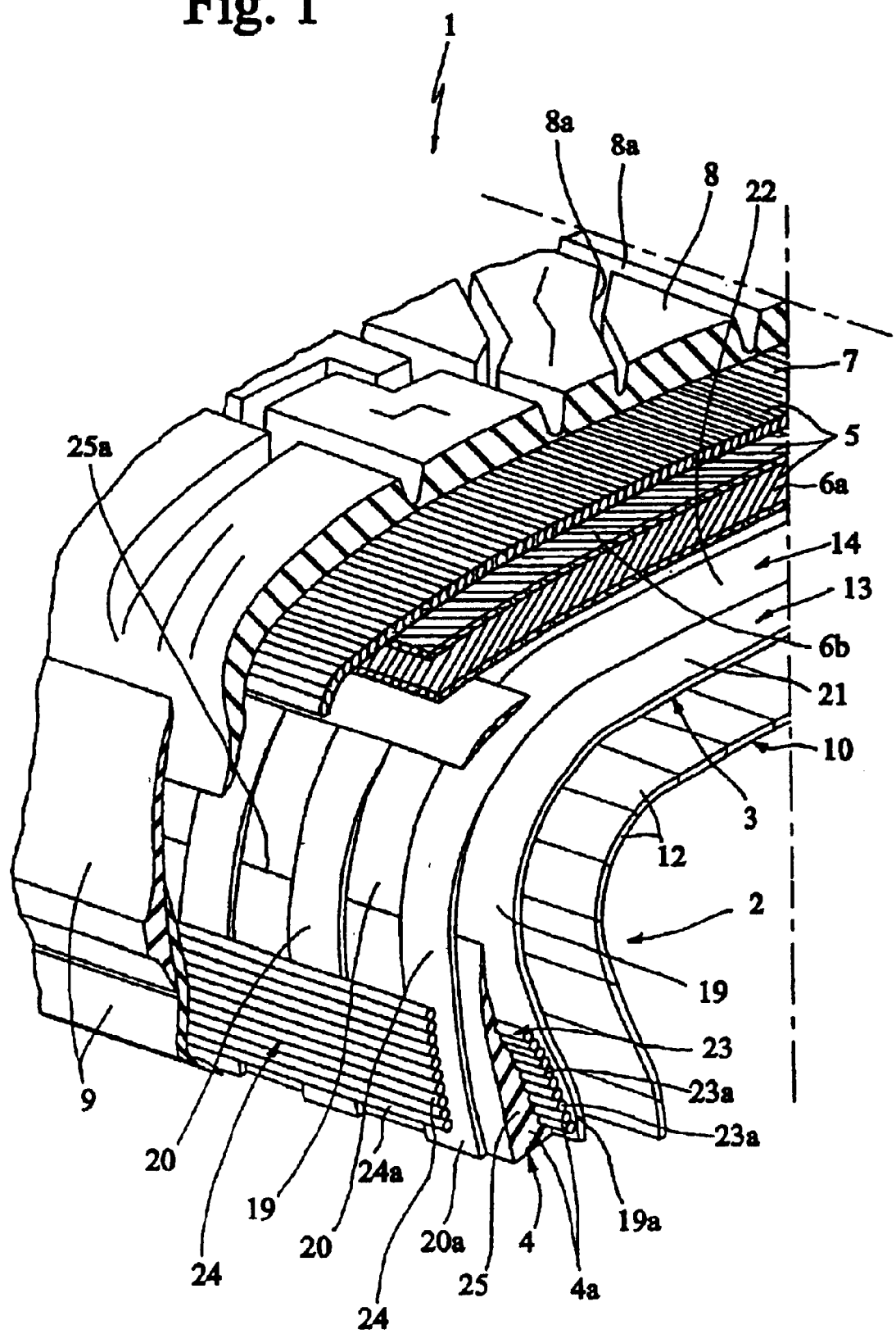
FIG. 1 is a fragmentary split perspective view of a tire provided with a carcass structure manufactured in accordance with the present invention.
Figure 5:
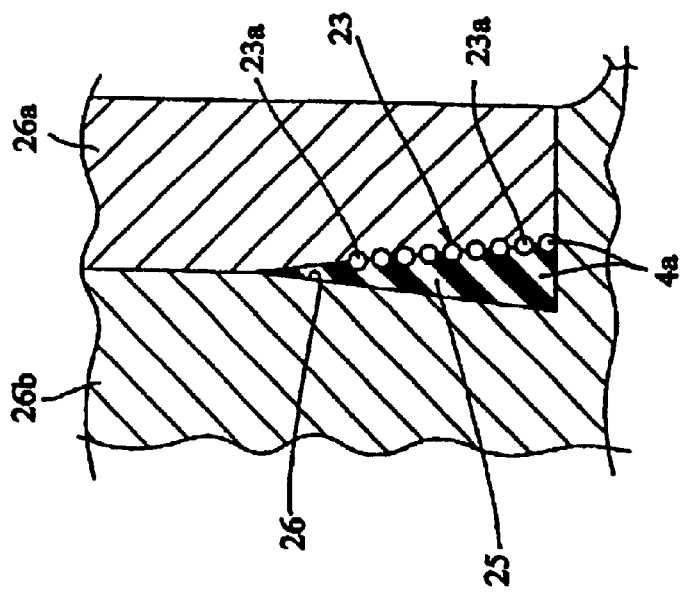
FIG. 5 is a fragmentary diametrical section view of a primary portion of an inextensible annular structure, to be inserted at the tire bead, during a moulding step for manufacturing of same.
Figure 6:
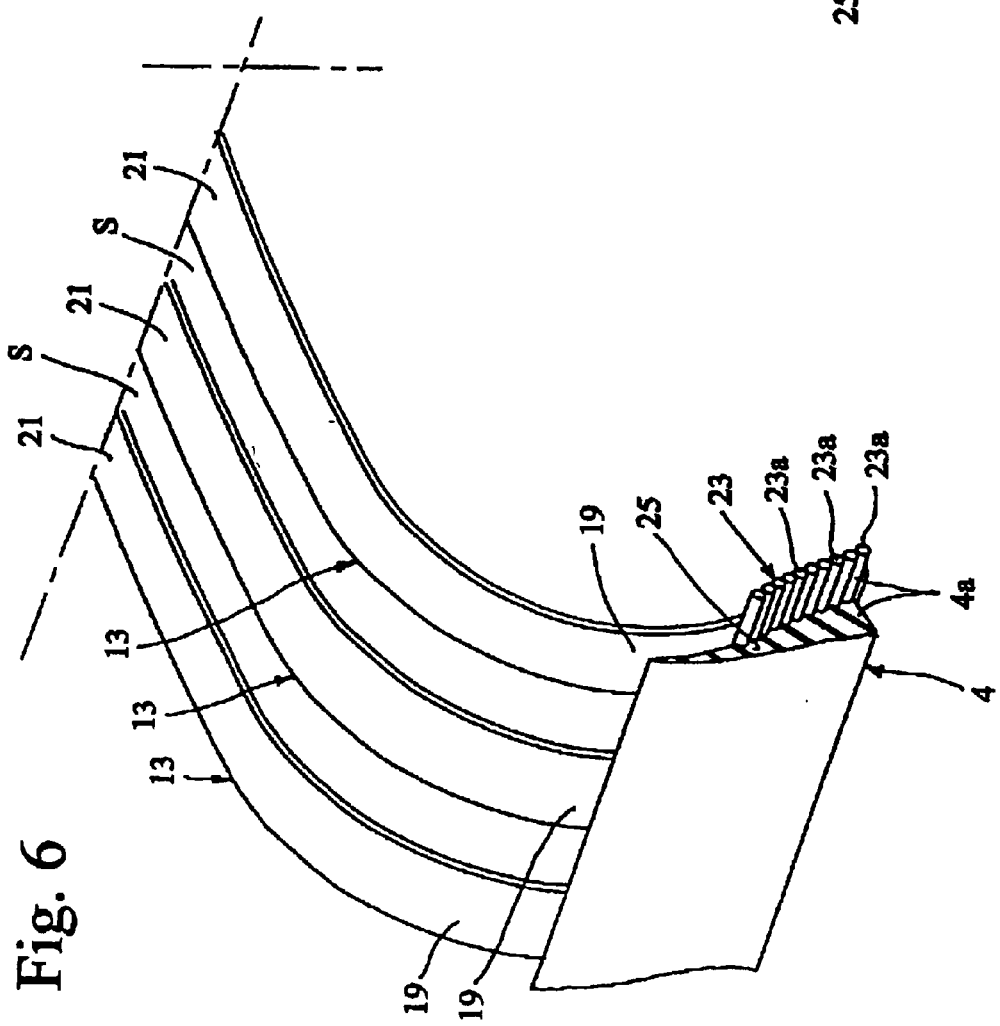
FIG. 6 is a fragmentary perspective view of the primary portion of the inextensible annular structure laterally applied to the side flaps of the strip-like sections belonging to the first series.

With reference to the drawings, a tire for vehicle wheels having a carcass structure 2 manufactured by a method in accordance with the invention has been generally identified by reference numeral 1.

The carcass structure 2 has at least one first carcass ply 3 substantially shaped in a toroidal conformation and engaged, by its opposite circumferential edges, with a pair of inextensible annular structures 4 each of which, when the tire has been finished, is located at the region usually identified by the name of "bead".

Applied to the carcass structure 2, at a circumferentially outer position, is a belt structure 5 comprising one or more belt strips 6a, 6b and 7. Circumferentially overlapping the belt structure 5 is a tread band 8 in which, following a moulding operation carried out concurrently with tire vulcanization, longitudinal and transverse hollows 8a arranged to define a desired "tread pattern" have been formed.

The tire further comprises a pair of so-called "sidewalls" 9 laterally applied to the carcass structure 2 on opposite sides thereof.

The carcass structure 2 can be possibly coated on its inner sides with a so-called "liner" 10, essentially consisting of a layer of an air-proof elastomer material adapted to ensure a tight seal of the tire itself when inflated.

Figure 7:
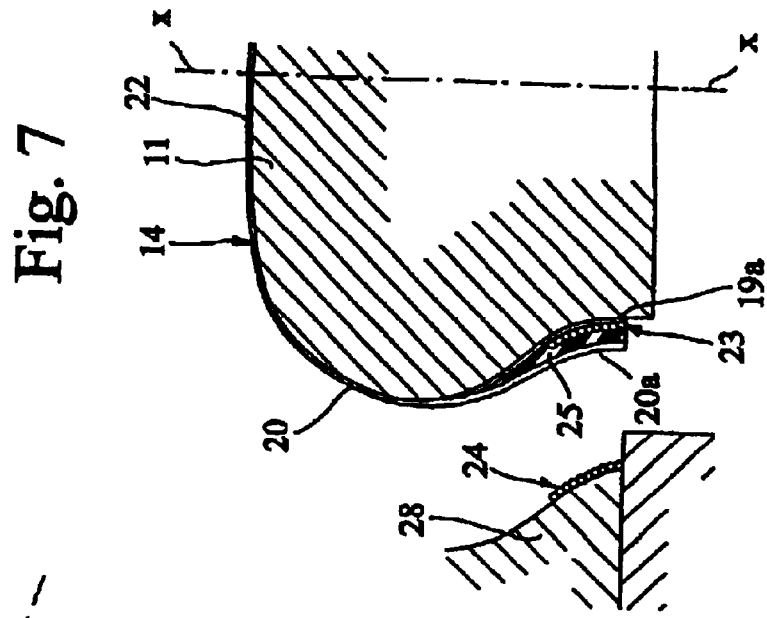
FIG. 7 is a diagrammatic cross-section view showing application of an additional portion of the annular reinforcing structure to the bead.

Assembling of the above listed components, as well as production of one or more of same, takes place with the aid of a toroidal support 11, diagrammatically shown in FIG. 7, having a shape matching that of the inner walls of the tire to be made.

The toroidal support 11 can have reduced sizes relative to those of the finished tire, according to a linear measure preferably included between 2% and 5%, taken just as an indication along the circumferential extension of said support at its equatorial plane X—X coinciding with the equatorial plane of the tire itself.

The toroidal support 11, not described or illustrated in detail as it is not particularly important to the aims of the invention, can be for example made up of a collapsible drum or an inflatable chamber suitably reinforced for taking and keeping the desired toroidal conformation in an inflated condition.

After the above statements, manufacturing of tire 1 first involves formation of the carcass structure 2, beginning with the possible formation of liner 10.

This liner 10 can be advantageously made by circumferential winding around the toroidal support 11 of at least one ribbon-like small band 12 of an air-proof elastomer material, produced by an extruder and/or a calender placed close to the toroidal support itself. As can be inferred from FIG. 1, winding of the ribbon-like small band 12 substantially takes place in circumferential coils disposed consecutively in side by side relationship so as to follow the cross-section outline of the outer surface of the toroidal support 11.

To the purposes of the present invention, by cross-section outline it is intended the configuration exhibited by the half-section of the toroidal support 11 sectioned in a plane radial to its own geometric rotation axis, not shown in the drawings, coinciding with the geometric rotation axis of the tire and, consequently, of the carcass structure 2 being manufactured.

In accordance with the present invention, the carcass ply 3 is directly formed on the toroidal support 11 by, as better clarified in the following, laying down a plurality of strip-like sections 13, 14 formed of at least one continuous strip-like element 2a preferably having a width included between 3 mm and 15 mm.

As viewed from FIG. 2, preparation of the continuous strip-like element 2a essentially involves that one or more thread-like elements 15, and preferably three to ten thread-like elements 15, fed from respective reels 15a, should be guided through a first extruder 16 associated with a first extrusion apparatus 17 supplying raw elastomer material through the extruder itself.

It is pointed out that, to the purposes of the present description, by "extruder" it is intended the extrusion apparatus portion also identified in the art as "extrusion head", provided with a so-called "die" passed through by the product being worked at a shaped outlet port conveniently sized for meeting the geometric and dimensional features to be given to the product itself.

The elastomer material and thread-like elements 15 are intimately joined within the extruder 16, giving rise at the extruder outlet to the continuous strip-like element 2a formed of at least one layer of elastomer material 18 in the thickness of which the thread-like elements themselves are incorporated.

Depending on requirements, guiding of the thread-like elements 15 in extruder 16 can take place in such a manner that they are not integrally incorporated into the elastomer material 18 layer but appear on one or both of the surfaces thereof.

The thread-like elements 15 can be each made, for example, either of a textile cord preferably of a diameter included between 0.6 mm and 1.2 mm, or of a metallic cord preferably of a diameter included between 0.3 and 2.1 mm.

Advantageously, if required, the thread-like elements 15 can be disposed in the continuous strip-like element 2a in such a manner that they give the obtained carcass ply 3 unexpected qualities of compactness and homogeneity. To this purpose, the thread-like elements can be disposed for example according to a thickness greater than six thread-like elements per centimeter, circumferentially measured on the carcass ply 3 close to the equatorial plane X—X of tire 1. In any case it is preferably provided that the thread-like elements 15 should be disposed in the strip-like element 2a according to a mutual distance between centres not lower than 1.5 times the diameter of the thread-like elements themselves, in order to enable an appropriate rubberizing between the adjacent threads.

The continuous strip-like element 2a coming out of extruder 16 can be advantageously guided, possibly through a first accumulator-compensator device 17a, on a deposition apparatus the structure and operating features of which are described in more detail in the European Patent Application No. 97830731.2 in the name of the same Applicant, contents of which is considered as herein incorporated.

This deposition apparatus is suitable for sequentially cutting the continuous strip-like element 2a for obtaining strip-like sections 13, 14 of predetermined length.

Cutting of each strip-like section 13, 14 is immediately followed by deposition of same section onto the toroidal support 11, giving the strip-like section a U-shaped configuration around the cross-section outline of the toroidal support itself, so that in the strip-like section 13, 14 two side portions 19, 20 can be identified which extend radially towards the axis of the toroidal support 11, at positions axially spaced apart from each other, as well as a crown portion 21, 22, extending at a radially outer position between said side portions.

Due to the sticking quality of the raw elastomer material forming layer 18 coating the thread-like elements 15, a steady adhesion of the strip-like element 13, 14 to the surfaces of the toroidal support 11 is ensured, even in the absence of liner 10 on the toroidal support itself. In more detail, the above described adhesion appears as soon as the strip-like section 13, 14 comes into contact with the toroidal support 11 at a radially outer region of its cross-section outline.

In addition to, or in place of the above described exploitation of the natural sticking quality of the elastomer material, holding of one or more of the strip-like sections 13, 14 on the toroidal support 11 can be obtained by carrying out a suction action produced through one or more suitable holes arranged on said toroidal support.

The toroidal support 11 can be driven in angular rotation according to a step-by-step movement in synchronism with operation of said deposition apparatus, in such a manner that each cutting action of each strip-like section 13, 14 is followed by deposition of same onto the toroidal support at a position circumferentially spaced apart from the previously laid down section 13, 14.

In more detail, rotation of the toroidal drum 11 takes place according to an angular pitch to which a circumferential displacement equal to a multiple of the width of each strip-like section 13, 14, and more specifically twice said width, corresponds.

It is to point out that to the aims of the present description the term "circumferential", when not otherwise stated, refers to a circumference lying in the equatorial plane X—X and close to the outer surface of the toroidal support 11.

In accordance with the present invention, the above described operating sequence is such that, by a full revolution of the toroidal support around its own axis, deposition of a first series of strip-like sections 13, circumferentially distributed according to a circumferential pitch which is twice the width of each of them, is caused. Therefore, as clearly viewed from FIG. 4, an empty space "S" is left between one and the other of the sections belonging to the first series, which empty space, at least at the crown portions 21 of said sections, has the same width as sections themselves.

Manufacturing of a carcass structure 2 then goes on with the step of applying said inextensible annular structures 4, or at least primary portions 4a of same, close to each of the inner circumferential edges of the carcass ply 3 being manufactured, for the purpose of obtaining the carcass regions known as "beads", which are particularly intended for ensuring anchoring of the tire to a corresponding mounting rim.

Each of said annular reinforcing structures 4 comprises a first circumferentially inextensible annular insert 23, substantially having the shape of a crown concentric with the geometric rotation axis of the toroidal support 11 and located at a circumferentially inner position against the end flaps 19a exhibited by the strip-like sections 13 belonging to the first series.

The first annular insert 23 is made up of at least one elongated metal element wound up in several substantially concentric coils 23a. Coils 23a can be defined either by a continuous spiral or by concentric rings formed of respective elongated elements.

Combined with the first annular insert 23 is a circumferentially inextensible annular insert 24 substantially extending according to a respective circular crown disposed in side by side relationship with the first annular insert 23 and suitably spaced apart therefrom.

The second annular insert 24 as well, is preferably made up of at least one elongated metal element wound up in several substantially concentric coils 24a that can be defined either by a continuous spiral or by concentric rings formed of respective elongated elements.

Preferably, the second annular insert 24 has a radial extension, given by the difference between the minimum inner radius and the maximum outer radius of the annular insert itself, greater than the radial extension of the first annular insert 23.

Interposed between the first and second annular inserts 23, 24 is at least one filling body 25 of elastomer material, preferably of the thermoplastic type, having a hardness included between 48° and 55° Shore D, measured at a temperature of 23° C.

As better clarified in the following, during use of the tire the above described annular structures 4 lend themselves to cooperate with the components of the carcass ply 3 to efficiently counteract the tendency of the beads to rotate around their resting points on the rim, under the effect of slip thrusts directed in parallel to the rotation axis of tire 1. This tendency to rotation appears particularly evident when the tire is employed under partial or full deflation conditions.

After the above statements, manufacturing of each annular structure 4 can for example preferably provide that a first inextensible annular insert 23 should be formed within a moulding cavity 26 defined by a mould 26a, 26b, by deposition of at least one elongated element in concentric coils 23a arranged in mutual side by side relationship, according to circumferences of progressively increasing diameter around their geometric winding axis, corresponding to the rotation axis of the finished tire.

This operation can be advantageously carried out by winding of the elongated element in a helical forming seat arranged in a first cheek 26a of the mould 26a, 26b that, to this purpose, can be driven in rotation around its own geometric axis.

Deposition of the elongated element can be advantageously preceded by a rubberizing step in which the elongated element itself, preferably of a metal material, is coated with at least one layer of raw elastomer material that, in addition to ensuring an excellent rubber-metal bond on the elongated element itself, promotes adhesion of same for its steady placement in said helical seat.

In addition, at least the first cheek 26a may be advantageously provided to be made of a magnetic material or a material to be electromagnetically activated, so as to suitably attract and retain the elongated element, thereby ensuring a steady positioning of coils 23a as they are formed.

Then within the moulding cavity 26 the filling body 25 is formed. Forming of said body can be conveniently carried out by interposing, between the first cheek 26a carrying the first annular insert 23 and the second cheek 26b, at least one annular element of raw elastomer material of predetermined volume. This annular element can have any convenient conformation in cross-section, provided that its volume corresponds to the inner volume of the moulding cavity 26 when cheeks 26a, 26b are moved close to each other in a-closed condition of the mould.

Once the annular element has been positioned between cheeks 26a, 26b, closing of the moulding cavity 26 is carried out by mutual approaching of said cheeks. Under this circumstance, the volume of the moulding cavity 26 is reduced, so that the annular element of raw elastomer material is pressed and is subjected to deforming until it completely fills the moulding cavity itself, thereby forming the filling body 25 that remains intimately joined to the first annular insert 23.

As an alternative solution to the above description, formation of the filling body 25 can be carried out for example after mutually approaching cheeks 26a, 26b, by filling the moulding cavity 26 with elastomer material introduced by injection, or by adopting any other manner which may be convenient for a person skilled in the art.

By operating as above described, respective primary portions 4a of the annular reinforcing structures 4 are obtained, accomplishment of which can advantageously take place close to the toroidal support 11, in such a manner that said primary portions, possibly with the aid of appropriate handling devices, can be directly picked up from mould 26a, 26b and laterally applied at axially opposite positions relative to the equatorial plane of the toroidal support, each of them with the first annular insert 23 against the previously-arranged end flaps 19a of sections 13 belonging to the first series.

As an alternative solution to the preceding description, accomplishment of the primary portions 4a can involve formation of the filling body 25 separately from the first annular insert 23, and subsequent union of the filling body with the first annular insert previously applied to the end flaps 19a of the strip-like sections 13 laid down on the toroidal support 11.

In more detail, in accordance with a preferential embodiment, the first annular insert 23 is preferably directly manufactured against the end flaps 19a of the strip-like sections 13, coils 23a being formed by winding up the thread-like element with the possible aid of rollers or other suitable means acting against the surface of the toroidal support 11.

The sticking quality of the elastomer layer 18 coating the strip-like sections 19 belonging to the first series, as well as of the possible liner 10 previously laid down on the drum itself ensure a steady positioning of the individual coils 23a being formed.

Subsequently, the filling body 25 can be in turn directly formed against the first annular insert 23, by applying a continuous strip of elastomer material coming out of an extruder placed close to the drum 11 itself, for example. The continuous strip may have the definitive conformation in section of the filling body 25 already on its coming out of the respective extruder. Alternatively, the continuous strip shall have a reduced section compared with that of the filling body, and the latter will be obtained by application of the strip in several coils disposed in side by side and/or overlapping relationship, so as to define the filling body 25 in its final configuration.

After application of the primary portions 4a of the annular reinforcing structures 4, formation of the carcass ply 3 is completed by deposition of a second series of strip-like sections 14 obtained by cutting the continuous strip-like element 2a to size, which sections 14 are applied to the toroidal drum 11 in the same manner as described for the strip-like sections 13 belonging to the first series.

Figure 8:
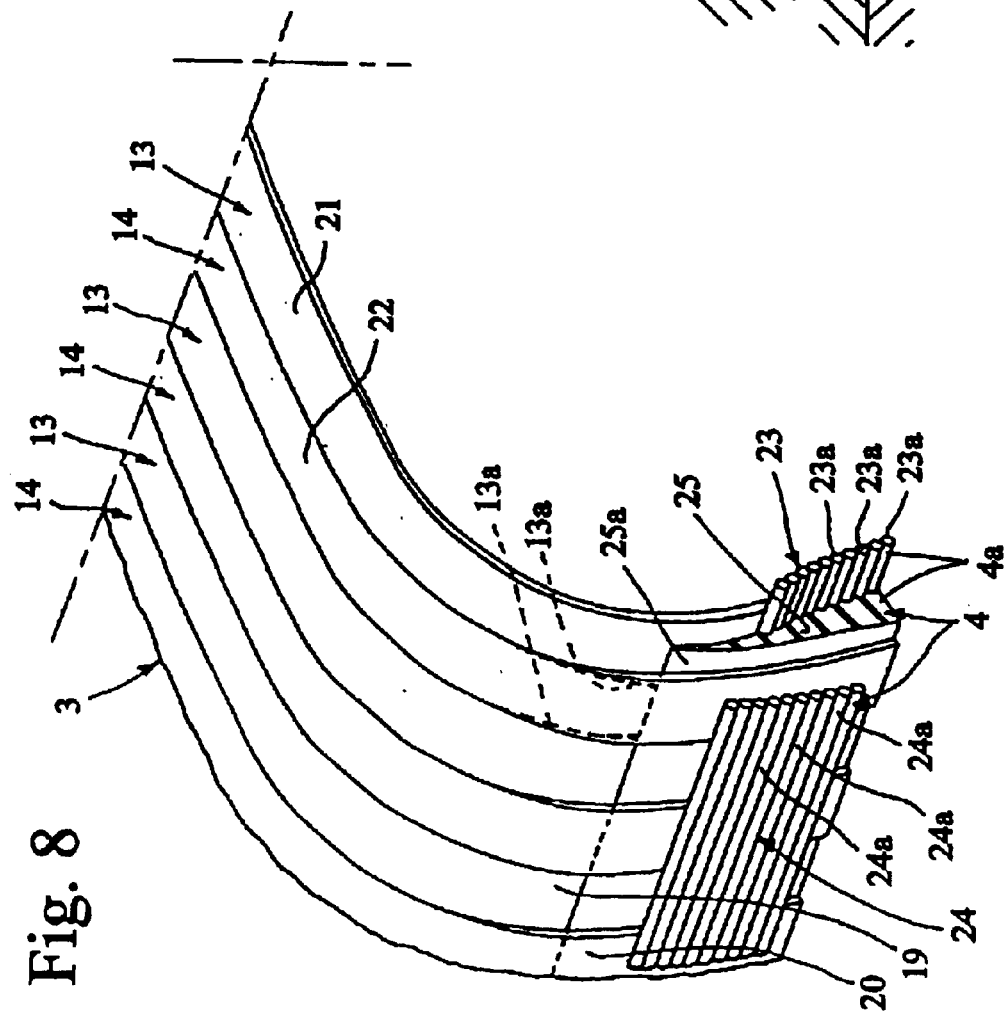
FIG. 8 is a fragmentary perspective view of the carcass structure after application of a second series of strip-like sections and of an additional portion of the reinforcing structure to the bead.

As clearly viewed from FIG. 8, each section 14 belonging to the second series is laid down in a U-shaped conformation around the cross section outline of the toroidal support 11, between two consecutive sections 13 belonging to the first series. In more detail, each section 14 belonging to the second series has a respective crown portion 22 circumferentially interposed between the crown portions 21 of sections 13 belonging to the first series, to fill space "S" existing therebetween, as well as a pair of side portions 20 carrying the end flaps 20a of the section itself in superposed relationship with the respective primary portions 4a of the annular reinforcing structures 4, at axially opposite positions relative to the end flaps 19a of sections 13 belonging to the first series.

In other words, the primary portion 4a of each annular reinforcing structure 4, having a section outline substantially in the form of a triangle the vertex of which is turned away from the tire axis, has an axially inner side turned towards the end flaps 19a of the strip-like sections 13 belonging to the first series, and an axially outer side turned towards the end flaps 20a of sections 14 belonging to the second series.

In addition, the side portions 20 of each section 14 belonging to the second series may be also provided to partly overlap the side portions 19 of two consecutive sections 13 belonging to the first series, each at a stretch included between the radially outer edge 25a of the respective primary portion 4a and the transition region between the side portion itself and the crown portion 21.

The overlapping regions of the strip-like sections 13 belonging to the first series are identified by 13a in FIG. 8.

Due to the mutual convergency between the contiguous side portions 19, 20 oriented radially of the geometric axis of the toroidal support 11, overlapping or covering of the side portions 19 of sections 13 belonging to the first series, i.e. the circumferential width of the overlapping regions 13a, progressively decreases starting from a maximum value close to the radially outer edge 25a of the primary portion 4a of each annular reinforcing structure 4, until a null value at the transition region between the side portions 19, 20 and crown portions 21, 22.

If a more homogeneous distribution of the thread-like elements 15 forming sections 13, 14 of the first and second series respectively is wished to be obtained close to beads, a pressing step is provided to be sequentially executed on the continuous strip-like element 2a at the regions of its longitudinal extension corresponding to the ends of the strip-like sections 13, 14 to be obtained subsequently to the cutting actions. In this way, on the extension of each strip-like section 13, 14 regions of greater width are defined which are located at the inner circumferential edges of the formed carcass ply 3.

The pressing action causes a reduction in the thickness of the elastomer layer 18 and an increase in the width of the strip-like element 2a and, as a result, moving away of the thread-like elements 15 from each other. By so doing, the end flaps 19a, 20a of each section 13, 14 can be widened as far as they have, at their circumferentially inner ends, a width which is twice the crown portions 21, 22, so as to integrally cover the respective inner and outer sides of the primary portions 4a of each annular reinforcing structure 4.

After deposition of the strip-like sections 14 belonging to the second series has been carried out in the above described manner, forming of the annular structures 4 for bead reinforcement is completed.

To this aim, as shown in FIG. 7, for each of the reinforcing structures 4 the second annular insert 24 shaped as a crown is formed, being obtained, for example, by winding of a second elongated element in concentric coils 24a at a forming seat 27 arranged in a die 28, in the same manner as said with reference to formation of the first circumferentially inextensible insert.

The second insert 24 therefore constitutes an additional portion of the reinforcing structure 4 which is applied against the end flaps 20a of the strip-like sections 14 belonging to the second series, by axial approaching of the die 28 to the toroidal support 11, for example.

Alternatively, the second elongated element can be directly wound against the carcass ply 3 previously formed on the toroidal support 11, for the purpose of forming the second annular insert 24 directly in contact with the carcass ply itself.

Following this operation, each of the end flaps 20a of sections 14 belonging to the second series remains advantageously enclosed between the primary portion 4a and the additional portion 24 of the respective annular reinforcing structure 4.

In accordance with a possible variant embodiment, the second circumferentially inextensible insert 24 can be directly joined to the filling body 25, on the opposite side relative to the first circumferentially inextensible insert 23. To this aim, the second insert 24 can be directly made on the previously formed filling body and/or applied to the carcass structure 2 being manufactured. Alternatively, the second insert 24 can be formed on the second cheek 26b of mould 26a, 26b before closing of same for formation of the filling body 25, in such a manner that both inextensible inserts 23, 24 are joined to the filling body 25 concurrently with formation of same.

In tires of the radial type a belt structure 5 is usually applied to the carcass structure 2.

Said belt structure 5 can be made in any manner convenient for a person skilled in the art and, in the embodiment shown, it essentially comprises a first and a second belt strips 6a, 6b having cords with a respectively crossed orientation. Superposed on the belt strips is an auxiliary belt strip 7, for example obtained by winding of at least one continuous cord according to coils disposed axially in side by side relationship on the first and second belt strips 6a, 6b.

Then, the tread band 8 and sidewalls 9, to be also obtained in any manner convenient for a person skilled in the art, are applied to the belt structure 5.

Examples of a belt structure, of sidewalls and of a tread band to be advantageously adopted for completely manufacturing tire 1 on the toroidal support 11 are described in the European Patent Application No. 97830632.2 in the name of the same Applicant.

Tire 1 thus manufactured is now ready to be submitted, after removal from support 11, to a vulcanization step that can be conducted in any known and conventional manner.

The present invention achieves important advantages.

In fact, the carcass structure in reference can be directly obtained on a toroidal support on which the whole tire can be advantageously formed. In this way, all problems connected with manufacturing, storage and management of semifinished products, common to manufacturing processes of traditional conception, are eliminated.

As compared with the method described in document U.S. Pat. No. 5,362,343 the manufacturing time for each carcass ply can be greatly reduced, by virtue of the simultaneous deposition of as many thread-like elements as they are contained in each strip-like section 13, 14 or in the continuous strip-like element 2a from which sections 13, 14 come. Employment of strip-like sections 13, 14 also dispenses with the need for previously laying down liner 10 on the toroidal support 11. The elastomer layer 18 employed in forming the continuous strip-like element 2a is in fact adapted by itself to ensure an efficient adhesion of same to the toroidal support 11, thereby ensuring a steady positioning of the individual sections 13, 14.

Accuracy in positioning of the strip-like sections 13, 14 and thread-like elements integrated thereinto is further improved by the fact that each strip-like section has an important structural consistency that makes it insensitive to vibrations or similar oscillation effects which can be transmitted by the deposition apparatus. In this connection it is to note that deposition of individual cords, as described in U.S. Pat. No. 5,362,343, may be somewhat problematic, exactly due to vibrations and/or oscillations undergone by said cords during the deposition step.

Furthermore, simultaneous deposition of a plurality of thread-like elements in accordance with the invention enables the deposition apparatus to be operated at slower rates than required when deposition of individual cords is concerned, which is a further advantage in terms of working accuracy without on the other hand impairing productivity.

Besides, deposition of strip-like sections directly crownwise to a toroidal support of an outline substantially identical with that of the finished tire enables thicknesses to be achieved that cannot be reached in the art by known methods providing deposition of a carcass ply in the form of a cylindrical sleeve and consequent shaping of same into a toroidal form, with consequent thinning of the carcass ply cords disposed crownwise to the finished tire.

In addition to the above, each strip-like section can be steadily fastened to the toroidal support by a vacuum effect produced through possible suction ducts, which steady fastening by vacuum cannot be achieved by known processes carrying out deposition of individual cords.

If required, the side portions of the strip-like sections can be disposed according to a suitably increased inclination relative to a direction radial to the toroidal support axis, which will enable the expansion undergone by the tire during the stretching step imposed to it on vulcanization to be efficiently helped. In fact, under these circumstances, the side portions 19, 20 tend to take an orientation in a plane radial to the tire, under the effect of the expansion imposed to the tire itself.

The construction and structure conception of the subject tire, particularly with reference to its carcass structure 2, enables important improvements to be achieved in terms of structural strength, above all close to the sidewalls and beads where a greater structural strength is usually required, as well as in terms of behaviour, especially in connection with the effects of the slip thrusts that occur when tires are run on bends, at the same time benefiting from all advantages typically correlated with a single-ply carcass structure.

In particular, the construction features of the inextensible annular structures 4 and the modalities according to which they are integrated in the carcass ply are such that they further increase the structural strength of tire 1 in the bead and sidewall regions.

In fact, the presence of the circumferentially inextensible annular inserts 23 intimately joined to the carcass ply 3 offers an excellent "link" with the thread like elements 15 belonging to one and the other series of strip-like sections 13, 14. Thus the carcass structure 2 is further strengthened at the regions corresponding to the tire beads without for the purpose requiring employment of additional strip-like inserts, usually called "flippers", wound as a loop around the inextensible annular structures 4, to which on the contrary resort is made in the known art.

Figure 9:
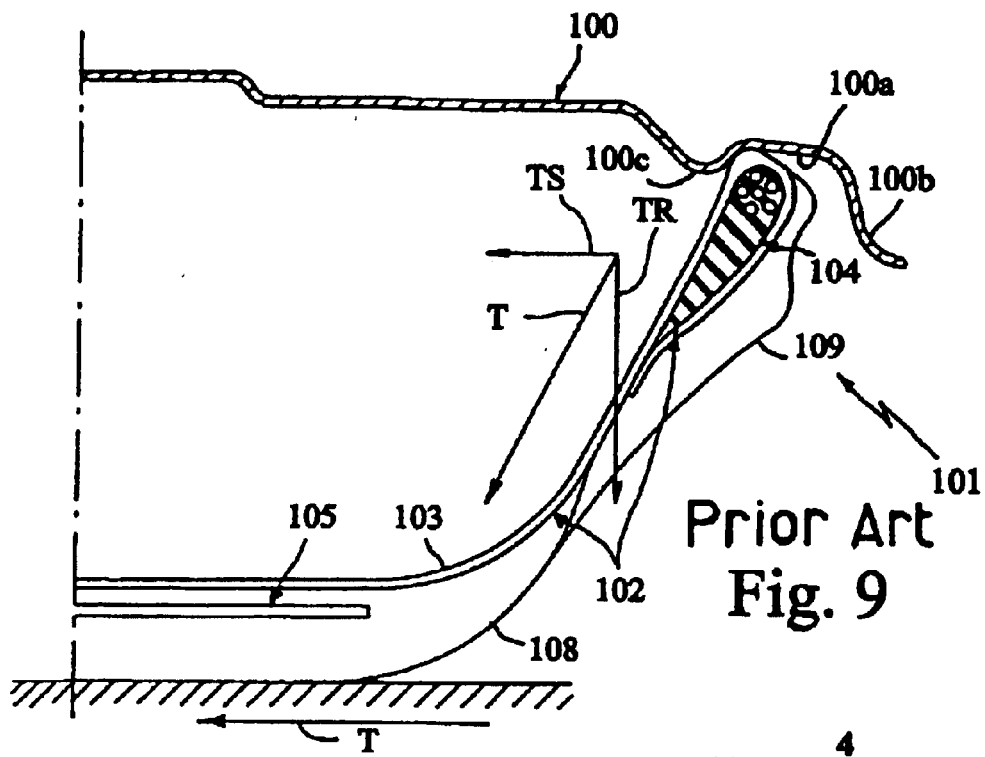
FIG. 9 is a cross half-section showing a conventional tire mounted to a respective rim, under a condition of slip running and partial deflation.
Figure 10:
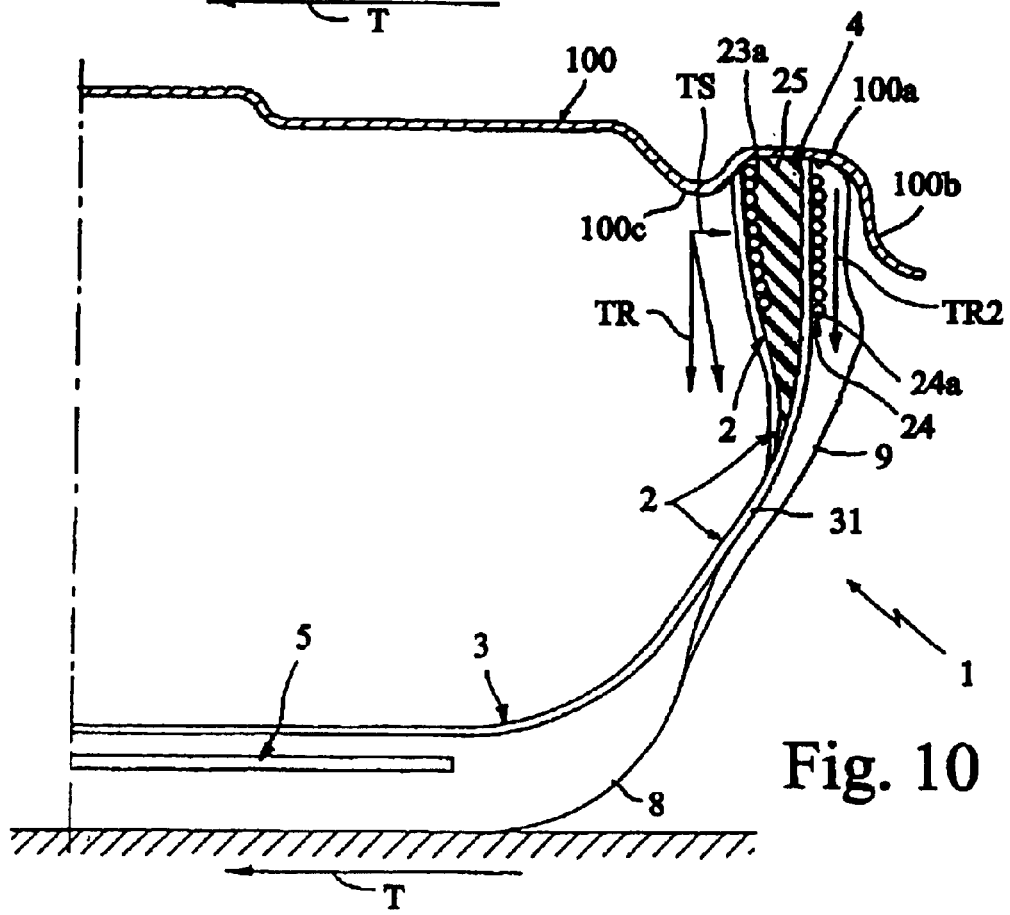
FIG. 10 is a cross half-section showing a tire in accordance with the invention mounted to a respective rim and under a condition of slip running and partial deflation.

From a comparison between FIGS. 9 and 10 it can be easily noticed the improvement produced by the construction expedients described above in connection with the tire behaviour under the effect of slip thrusts directed axially of the tire, generated when the tire is run on a bend, for example. For the sake of clarity, section dashing has been intentionally omitted from tires shown in FIGS. 9 and 10. It is also to point out that, for better highlighting the phenomena triggered by the slip thrusts, FIGS. 9 and 10 have been made with reference to tires under conditions of partial deflation.

In more detail, FIG. 9 shows a tire 101 of the traditional type, mounted on a respective rim 100 that, at each tire bead, has a bead seat 100a axially delimited by a flange 100b defining an outer side edge of the rim and a security hump 100c. The different components of tire 101 are marked by numeric indices obtained by adding 100 to the numeric value of the indices previously employed for corresponding parts of tire 1 in accordance with the invention.

In tire 101 made in accordance with the known art, the carcass ply or plies tend to bend at the tire sidewall under the effect of the slip thrust T, generated parallelly of the rotation axis of the tire by friction of the tread band 108 on the ground, during a bend.

This slip thrust T, transmitted along the ply or plies 103 of the carcass structure 102 up to the inextensible annular structures 104, generates a radial component Tr and an axial component Ts. The radial component Tr is counteracted by the circumferential inextensibility of the annular structure 104 resting, over the whole circumferential volume thereof, on the respective seat 100a provided in rim 100. The axial component Ts, oriented towards the equatorial plane of the tire, tends to move the tire bead away from the flange 100b of rim 100 and is usually counteracted by the security hump 100c. The radial sizes of the security hump are however rather limited and it may easily happen that, when the axial component Ts exceeds given values, the tire bead is removed from its respective seat 100a, instantaneously causing a full deflation and a consequent loss of functionality of tire 100. This phenomenon is also facilitated by the fact that the tire bead structured in accordance with the known art, under the effect of the slip thrust T, tends to "roll" on the security hump 100c.

The risks that the above described phenomenon of "unbeading" may occur are particularly important when the tire is forced to run under conditions of partial deflation, and the carcass structure 102 is therefore subjected to undergo important deformations under the effect of slip thrusts.

Referring now to the tire provided with a carcass structure in accordance with the invention, shown in FIG. 10, the annular structures 4 integrated between the end flaps of the sections belonging to the first and second series respectively prevent the tire beads from rotating, under the effect of the slip thrust T, around their resting point against the respective security humps 100c provided in rim 100.

In more detail, it is to note that the presence of the circumferentially inextensible annular inserts 23, 24 located directly in contact with the respective end flaps mutually spaced apart by interposition of the filling body 25, efficiently prevents the bead tendency to bend and rotate under the effect of the slip thrusts. In fact, on examining FIG. 10, it can be seen that the slip thrust T would tend to bend the inextensible annular structure 4 towards the equatorial plane of tire 1. Under this circumstance, the second annular insert 24 tends to be radially compressed, that is pushed to bend towards the tire axis, whereas the first annular insert 23 is subjected to a tensile stress in a radial direction. However, the circumferential inextensibility of the individual coils 23a, 24a forming inserts 23, 24, as well as the intimate union of said inserts with the strip-like elements 13, 14 having the respective thread-like elements 15 directed perpendicularly of the thread-like elements forming the coils of the inextensible inserts 23, 24, inhibit the capability of bending deformation of the inextensible annular structure 4 almost completely.

The slip force T is therefore equably shared between sections 13, 14 belonging to the first and second series respectively, and transmitted along said sections to the respective first and second inextensible annular elements 23, 24 arranged in structure 4.

Under this situation, the portion of the slip force T transmitted along the sections of the first series-until a region close to the first annular insert 23 gives rise to a radial component $Tr_1$ tending to move the bead away from the bead seat 100a and counteracted by the circumferential inextensibility of the annular structure 4, as well as to an axial component $Ts_1$ tending to push the bead against the circumferential flange 100b, thereby ensuring maintenance of a steady positioning of said bead.

The slip force T portion transmitted along the sections of the second series generates a radial component $Tr_2$ as well, which is counteracted by the circumferential inextensibility of the second annular insert 24, and an axial component tending to push the bead against the flange 100b but which has a practically zero value when, as in the situation shown, the inner circumferential edge of the second carcass ply takes an orientation perpendicular to the axis of tire 1.

A correct positioning of the bead is in any case ensured by the above described axial component $Ts_1$.

In this way, the tire having beads made in accordance with the present invention can bear the so-called "J-curve Test" without unbeading inflation pressures of 0.5 bar, whereas in the known art tires that are unable to counteract unbeading at pressures lower than 0.8–1.0 bar are considered as acceptable.

It is also to note that the annular inserts 23 and 24 furnish a further structure protection of the tire at the beads.

Increase in the structural strength at the sidewalls has been advantageously obtained without involving an excessive stiffening at the carcass structure crown, where the sections of the single ply 3 are circumferentially disposed in side by side relationship in the absence of mutual superposition. This aspect is particularly advantageous with reference to high-performance low-profile tires where the structural strength of the sidewalls is greatly critical, also due to the high torque values that the tire must be able to transmit.

What is claimed is:

1. A method for manufacturing a tire, comprising the steps of:

preparing strip sections;

laying down a first series of the snip sections on a toroidal support;

applying at least primary portions of annular reinforcing structures against end flaps of the strip sections of the first series at axially-opposite positions relative to an equatorial plane of the toroidal support; and laying down on the toroidal support at least one second series of the strip sections;

wherein each strip section comprises longitudinal and parallel thread elements at least partly coated with at least one layer of elastomer material;

wherein each strip section of the first series extends in a substantially U-shaped configuration around a cross-sectional outline of the toroidal support, wherein each ship section of the first series extends in a substantially U-shaped configuration around a cross-sectional outline of the toroidal support, wherein each strip section of the first series is circumferentially distributed according to a circumferential pitch corresponding to a multiple of a width of the strip sections of the first series, wherein each strip section of the second series extends in a substantially U-shaped configuration around the cross-sectional outline of the toroidal support between two consecutive strip sections of the first series, and wherein each strip section of the second series comprises end flaps overlapping respective primary portions of the annular reinforcing structures at an axially-opposite position relative to the end flaps of the strip sections of the first series.

2. The method of claim 1, further comprising the step of applying additional portions of the annular reinforcing structures against the end flaps of the strip sections of the second series, wherein each end flap of the strip sections of the second series is enclosed between the respective primary portions and respective additional portions of the annular reinforcing structures.

3. The method of claim 1, wherein each strip section or the first series and each strip section of the second series are laid down to form two side portions and a crown portion, wherein the side portions substantially extend toward a geometric rotation axis of the toroidal support at mutually-spaced-apart positions in an axial direction, wherein the crown portions extend at a radially outer position between respective side portions, and wherein the crown portions of each strip section of the first series and each strip section of the second series are disposed consecutively in side-by-side relationship along a circumferential extension of the toroidal support.

4. The method of claim 3, wherein the side portions of each strip section of the first series are each partly covered with a side portion of at least one circumferentially consecutive strip section of the second series at a stretch included between a radially-outer edge of the respective primary portions of the annular reinforcing structures and a transition region between the side portions and the crown portion of the strip sections of the first series.

5. The method of claim 4, wherein covering of the side portions of each strip section of the first series progressively decreases starting from a maximum value close to the radially-outer edge of the respective primary portions of the annular reinforcing structures until reaching a null value at the transition region between the side portions and the crown portion of the strip sections of the first series.

6. The method of claim 3, wherein the side portions of the strap sections of the first series and the side portions of the strip sections of the second series radially converge toward the geometric rotation axis of the toroidal support.

7. The method of claim 1, further comprising the step of producing regions of increased width of the strip sections of the first series and the strip sections of the second series close to primary portions or the annular reinforcing structures.

8. The method of claim 7, wherein the step of preparing the strip sections comprises sequentially cutting at least one continuous strip element incorporating the thread elements, and wherein the regions of increased width are produced on the at least one continuous strip element prior to sequentially cutting the at least one continuous strip element.

9. The method of claim 1, wherein formation or the primary portions of the annular reinforcing structures comprises the steps of:

laying down at least one first elongated element in concentric coils to form a first circumferentially-inextensible annular insert substantially in a form of a crown;

forming at least one filling body of elastomer material; and joining the at least one filling body to the first annular insert.

10. The method of claim 9, wherein the at least one first elongated element is deposited directly against the end flaps of the strip sections of the first series to form the first annular insert directly in contact with the strip sections of the first series.

11. The method of claim 9, wherein, after applying the first annular insert against the cud flaps of the strap sections of the first series, the at least one filling body is formed by depositing a continuous strip of elastomer material directly against the first annular insert.

12. The method of claim 9, wherein the at least one first elongated element is laid down in a seat defined in a moulding cavity in which the at least one filling body is subsequently formed, and wherein the step of forming the at least one filling body is carried out concurrently with the steps of joining the at least one filling body to the first annular insert.

13. The method of claim 9, wherein, after applying the first annular insert against the end flaps of the strip sections of the first series, the step of joining the at least one filling body to the first annular insert is carried out by applying the at least one filling body against the first annular insert.

14. The method of claim 9, wherein formation of the primary portion of the annular reinforcing structures further comprises the steps of:

depositing at least one second elongated element in concentric coils to form a second circumferentially-inextensible annular insert substantially in a form of a crown; and joining the second annular insert to the at least one filling body on an opposite side relative to the first annular insert.

15. The method of claim 2, wherein formation of the additional portions of the annular reinforcing structures comprises the steps of depositing at least one second elongated element in concentric coils to form a second circumferentially-inextensible annular insert substantially in a form of a crown.

16. The method of claim 15, wherein the at least one second elongated element is laid down directly against the end flaps of the strip sections of the second series during the formation of the additional portions of the annular reinforcing structures.

* * * * *

UNITED STATES PATENT AND TRADEMARK OFFICE
CERTIFICATE OF CORRECTION

PATENT NO. : 6,783,619 B2
DATED : August 31, 2004
INVENTOR(S) : Renato Caretta

It is certified that error appears in the above-identified patent and that said Letters Patent is hereby corrected as shown below:

Column 16,
Line 62, "snip sections" should read -- strip sections --.

Column 17,
Line 8, "ship section" should read -- strip section --.

Column 18,
Line 27, "cud flaps" should read -- end flaps --.

Signed and Sealed this

Tenth Day of May, 2005

JON W. DUDAS
*Director of the United States Patent and Trademark Office*